(12) United States Patent  (10) Patent No.: US 12,424,401 B2
Himiyama  (45) Date of Patent: Sep. 23, 2025

(54) PROTECTION ELEMENT AND ELECTRONIC DEVICE

(71) Applicant: DEXERIALS CORPORATION, Shimotsuke (JP)

(72) Inventor: Junpei Himiyama, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 209 days.

(21) Appl. No.: 18/268,420

(22) PCT Filed: Dec. 24, 2021

(86) PCT No.: PCT/JP2021/048270
§ 371 (c)(1),
(2) Date: Jun. 20, 2023

(87) PCT Pub. No.: WO2022/145374
PCT Pub. Date: Jul. 7, 2022

(65) Prior Publication Data
US 2024/0021386 A1    Jan. 18, 2024

(30) Foreign Application Priority Data
Dec. 28, 2020  (JP) .................. 2020-219150

(51) Int. Cl.
*H01H 37/76* (2006.01)
*H01H 85/055* (2006.01)

(52) U.S. Cl.
CPC .......... *H01H 37/76* (2013.01); *H01H 85/055* (2013.01)

(58) Field of Classification Search
CPC ......... H02J 7/00; H01H 85/46; H01H 85/055; H01H 37/76; H01H 2085/466; H02H 7/18; H01M 10/425; H01M 50/583; H01M 2200/103; Y02E 60/10
USPC ........................................... 361/104
See application file for complete search history.

(56) References Cited

U.S. PATENT DOCUMENTS

2021/0376592 A1* 12/2021 Nakajima ............ H02H 1/0007

FOREIGN PATENT DOCUMENTS

| JP | 2016062649 A | | 4/2016 | |
|---|---|---|---|---|
| JP | 2017174590 A | * | 9/2017 | ............. H01H 37/76 |
| JP | 2020057492 A | | 4/2020 | |
| JP | 2020092085 A | | 6/2020 | |

OTHER PUBLICATIONS

Machine translation of Yoneda Japanese Patent Document JP 2017-174590 A Sep. 2017 (Year: 2017).*
Office Action issued Feb. 13, 2024 in Japanese Patent Application No. 2020-219150 (with English translation), 10 pages.
(Continued)

*Primary Examiner* — Kevin J Comber
(74) *Attorney, Agent, or Firm* — Element IP, PLC (57) ABSTRACT

This protection element is provided with a first terminal, as well as a second terminal and a third terminal that are connected to the first terminal. Regarding the electrical resistance of a fuse element connecting the first terminal and the second terminal, at least a portion of a fuse element connecting the first terminal and the third terminal has a higher electrical resistance than the fuse element connecting the first terminal and the second terminal.

20 Claims, 6 Drawing Sheets

(56) References Cited

OTHER PUBLICATIONS

Office Action issued Nov. 8, 2024, in corresponding Korean Patent Application No. 10-2023-7018402 (with English translation), 10 pages.
International Search Report issued Mar. 8, 2022 in PCT/JP2021/048270 (with English translation), 4 pages.
Written Opinion issued Mar. 8, 2022 in PCT/JP2021/048270 (with English translation), 10 pages.
Combined Taiwanese Office Action and Search Report issued May 21, 2025, in corresponding Taiwanese Patent Application No. 110149104 (with machine English translation), 13 pages.

* cited by examiner

PROTECTION ELEMENT AND ELECTRONIC DEVICE

TECHNICAL FIELD

The present invention relates to a protection element and an electronic device.

The present application claims priority based on JP 2020-219150 filed in Japan on Dec. 28, 2020, and the contents thereof are incorporated herein.

BACKGROUND TECHNOLOGY

A configuration wherein a current path is interrupted by a fuse element itself generating heat and fusing when an overcurrent exceeding a rated value passes through a circuit board is known as a protection element. Moreover, a configuration having a heater inside wherein the heater is heated and the heat is used to fuse a fuse element by passing a current through the heater during an abnormality other than the generation of an overcurrent is known as a protection element.

Patent Document 1 discloses a protection element having a first fuse element and a second fuse element connected in series and a heater connected between the first fuse element and the second fuse element. This protection element is configured so that the first fuse element is fused before the second fuse element when an overcurrent flows through the first fuse element and the second fuse element.

CITATION LIST

Patent Documents

SUMMARY OF THE INVENTION

Problem to be Solved by the Invention

In a power source of a device having an output voltage of 20 V or less such as a mobile device, it is necessary to use a fuse, for example, to use a fuse having a rated current value of 5 A or less on the discharge side in order to comply with requirements of UL2054 (a battery pack standard) rated limited power sources (LPS: limited power source), and it is therefore necessary to increase the resistance value of the fuse (5.0 mΩ or more). Meanwhile, in recent mobile devices, the need for rapid charging has increased and a high charge current value of 5 A or more is used for rapid charging, so it is necessary to make the resistance value of the fuse to be 1.0 mΩ or less. In other words, opposing protection element characteristics are required to conform with LPS requirements and to meet the need for rapid charging. As a method for accomplishing both opposing requirements, there is a method of separating the charge terminal and the discharge terminal and using a protection element having a heater using a relatively low resistance fuse element when charging and using a protection element using a relatively high resistance fuse element when discharging; in other words, using two or more types of protection elements. However, using two or more types of protection elements has problems such as the size of the circuit becoming large.

The present invention is made in consideration of the above circumstances and has an object of providing a protection element that can interrupt a current path when discharging even at a relatively low current value and is capable of rapid charging without interrupting a current path when charging even at a relatively high current value. Moreover, it has an object of providing an electronic device typified by a mobile device provided with such a protection element and a power source.

Means to Solve the Problem

The present invention provides the following means in order to solve the above problems.

(1) The protection element of one embodiment of the present invention is provided with a first terminal, and a second terminal and third terminal respectively connected to the first terminal, wherein at least a portion of a fuse element connecting the first terminal and the third terminal has a higher electrical resistance than a fuse element connecting the first terminal and the second terminal.

(2) The embodiment according to (1) above is further provided with an intermediate electrode and having a first fuse element connecting the first terminal and the intermediate electrode, a second fuse element connecting the second terminal and the intermediate electrode, and a third fuse element connecting the third terminal and the intermediate electrode, wherein the third fuse element may be configured having a higher electrical resistance than the second fuse element.

(3) The embodiment according to (1) above is further provided with an intermediate electrode wherein the second terminal and the intermediate electrode are directly connected, and having a first fuse element connecting the first terminal and the intermediate electrode, and a third fuse element connecting the third terminal and the intermediate electrode, wherein the third fuse element may be configured having a higher electrical resistance than the first fuse element.

(4) The embodiment according to (2) or (3) above is further provided with a fourth terminal, wherein the fourth terminal may be configured connected to the intermediate electrode via a heater.

(5) The embodiments according to (1) to (4) above may be configured having the first terminal connected to a power source capable of charge and discharge, the second terminal connected to a charge line, and the third terminal connected to a discharge line.

(6) The electronic device according to one embodiment of the present invention is provided with a power source and the protection element according to (1) to (5) above connected to the power source.

(7) The embodiment according to (6) above may be configured provided with a control device for detecting a voltage of the power source and a switch for operating when an overcharge is generated in the power source based on the detected voltage.

(8) The embodiment according to (6) or (7) above wherein the power source is a lithium-ion secondary battery or a capacitor.

Effect of the Invention

According to the present invention, it is possible to provide a protection element that can interrupt a current path when discharging even at a relatively low current value and is capable of rapid charging without interrupting a current path when charging even at a relatively high current value. Moreover, according to the present invention, providing an electronic device typified by a mobile device provided with the above protection element and a power source.

DESCRIPTION OF THE EMBODIMENTS

Embodiments of the protection element of the present invention will be described in detail below with appropriate reference to drawings. The drawings used in the description below may illustrate characteristic components enlarged for convenience for ease of understanding the characteristics and may differ from the actual dimensional ratios of the constituent elements. Materials, dimensions, and the like used in the description below are examples, and the present invention is not limited by them. It is possible to appropriately change them within a scope that achieves the effect of the present invention. It is possible to change, omit, add, replace, or make other changes to positions, counts, ratios, types, sizes, shapes, and the like within a scope that does not deviate from the spirit of the present invention. So long as there are no particular problems, desired characteristics or conditions in each example may be shared in common.

Figure 1:
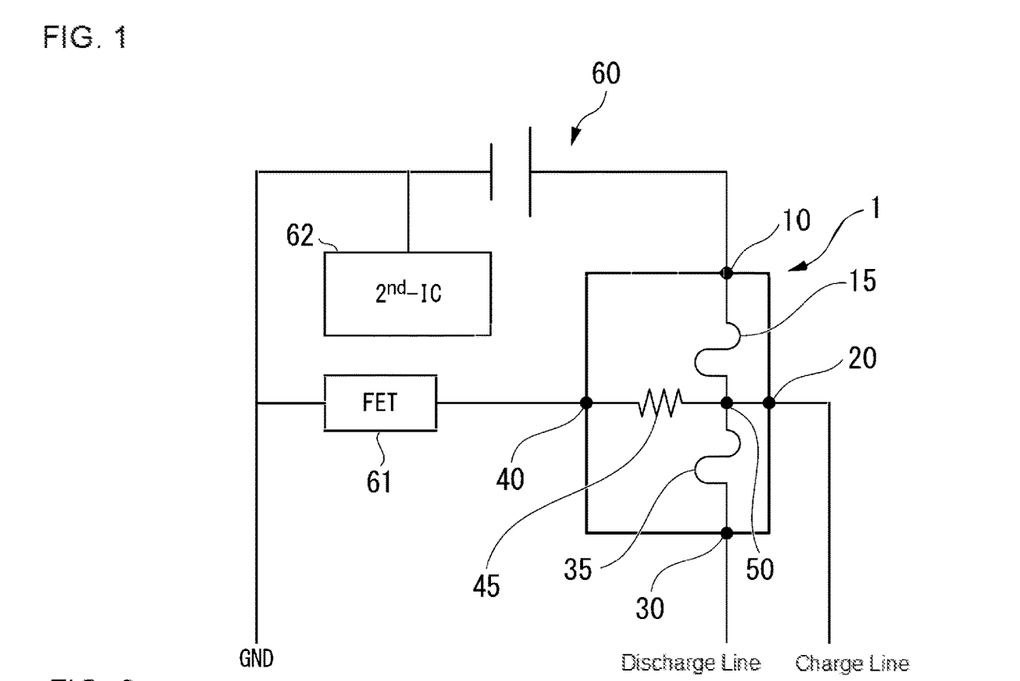
FIG. 1 A circuit diagram of a power source unit of an electronic device provided with a protection element of a first embodiment of the present invention.

FIG. 1 is a circuit diagram of a power source unit of an electronic device provided with a protection element of a first embodiment of the present invention. The electronic device is, for example, a mobile device such as a mobile phone, smartphone, or tablet-style computer, or a digital camera.

As illustrated in FIG. 1, a protection element 1 is provided with a first terminal a second terminal 20, a third terminal 30, a fourth terminal 40, and an intermediate electrode 50. The first terminal 10, second terminal 20, third terminal 30, and fourth terminal 40 are disposed so that the first terminal 10 and third terminal 30 are opposite each other and the second terminal 20 and the fourth terminal 40 are opposite each other.

The first terminal 10 is connected to the intermediate electrode 50 via a first fuse element 15. Moreover, the first terminal 10 is connected to a power source 60 provided in the electronic device. The power source 60 is capable of charge and discharge. For example, a secondary battery or capacitor may be used as the power source 60. In the present embodiment, a lithium-ion secondary battery is used as the power source 60.

The second terminal 20 is directly connected to the intermediate electrode 50. Therefore, the fuse element connecting the first terminal 10 and the second terminal 20 is the first fuse element 15. The rated current value of the first fuse element 15 is preferably 10 A or more and is more preferably in a range of 15 A or more and 30 A or less. Moreover, the resistance value of the first fuse element 15 is preferably 1.0 mΩ or less and is more preferably in a range of 0.15 mΩ or more and 0.6 mΩ or less.

The third terminal 30 is directly connected to the intermediate electrode 50 via a third fuse element 35. Therefore, the fuse elements connecting the first terminal 10 and the third terminal 30 are the first fuse element 15 and the third fuse element 35. An electrical resistance when the first fuse element 15 and the third fuse element 35 are connected in series is set to be higher than the first fuse element 15. Moreover, the third fuse element 35 is set to have a higher electrical resistance than the first fuse element 15. The rated current value when the first fuse element 15 and the third fuse element 35 are connected in series is preferably 5 A or less and is more preferably in a range of 1 A or more and 5 A or less. Moreover, the electrical resistance value when the first fuse element 15 and the third fuse element 35 are connected in series is preferably in a range of 5 mΩ or more and 20 Ω or less.

The second terminal 20 is connected to a charge line of the electronic device. A current flows through the first terminal 10, the first fuse element 15, the intermediate electrode 50, and the second terminal 20 during charging of the power source 60. Therefore, when an overcurrent is passed during charging of the power source 60, the current path is interrupted by the first fuse element 15 generating heat and fusing. Meanwhile, the third terminal 30 is connected to a discharge line of the electronic device. A current flows through the first terminal 10, the first fuse element 15, the intermediate electrode 50, the third fuse 35, and the third terminal 30 during discharge of the power source 60. Therefore, when an overcurrent is passed during discharge of the power source 60, the current path is interrupted by the third fuse element 35 generating heat and fusing.

Moreover, the fourth terminal 40 is connected to the intermediate electrode 50 via a heater 45. The fourth terminal 40 is connected to the discharge line. The fourth terminal is connected to a switch 61 provided in the electronic device. The switch 61 is connected to a control device 62. The control device 62 detects a voltage of the power source 60 and, based on the detected voltage, operates the switch 61 when, for example, an abnormality such as an overcharge arises in the power source 60. Thereby, a current is supplied to the fourth terminal and the heater 45 generates heat. The first fuse element 15 and the third fuse element 35 are fused by heat of the heater 45 transmitting to the intermediate electrode 50.

In the protection element 1, an electrical resistance when the first fuse element 15 and the third fuse element 35 are connected in series is set to be higher than an electrical resistance of the first fuse element 15. Therefore, safety during discharge can be secured because the rated current value during discharge can be made relatively lower than the rated current value during charge. Meanwhile, the power source 60 can be charged at a current value relatively higher during charge than during discharge and rapid charging is possible because the rated current value during charge can be made relatively higher than the rated current value during discharge. Moreover, higher safety can be secured during abnormalities other than generation of an overcurrent because the current path can be interrupted by causing the heater 45 to generate heat.

Next, a configuration example of the protection element 1 of the present embodiment will be described with reference to FIGS. 2 to 5.

Figure 2:
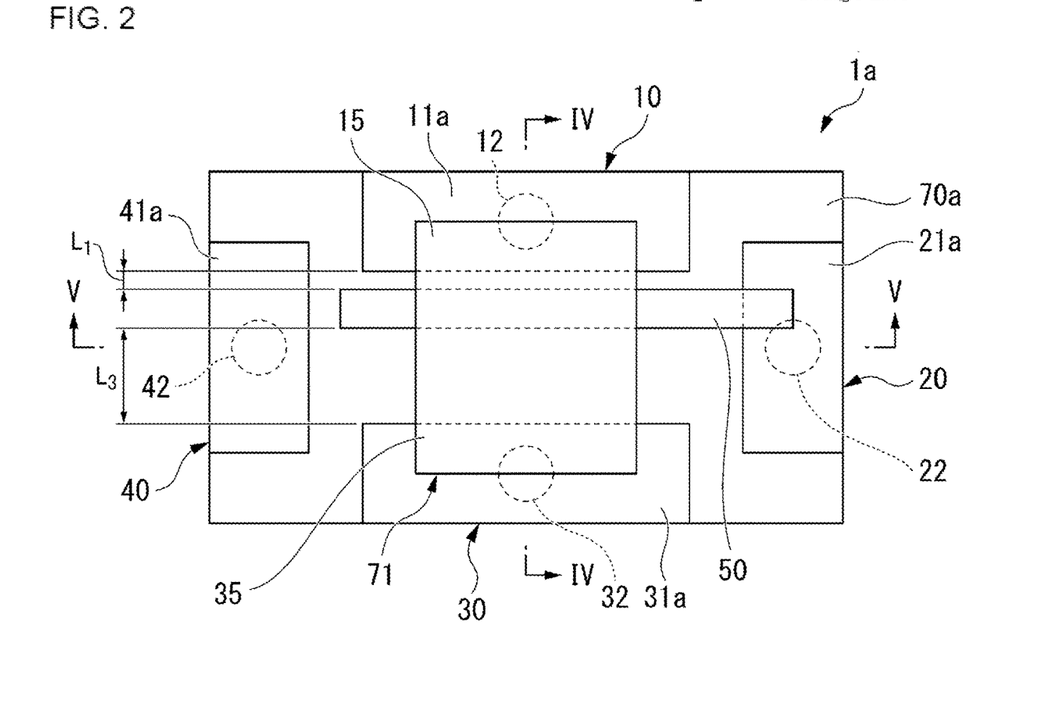
FIG. 2 A plan view illustrating one example of the protection element of the first embodiment of the present invention.
Figure 3:
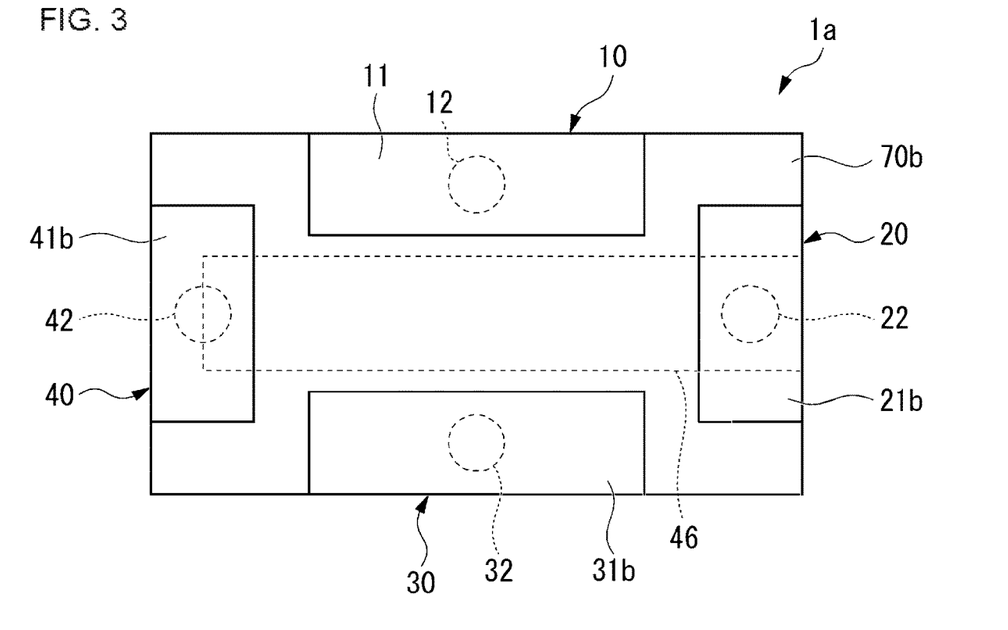
FIG. 3 A bottom surface view of the protection element illustrated in FIG. 2.
Figure 4:
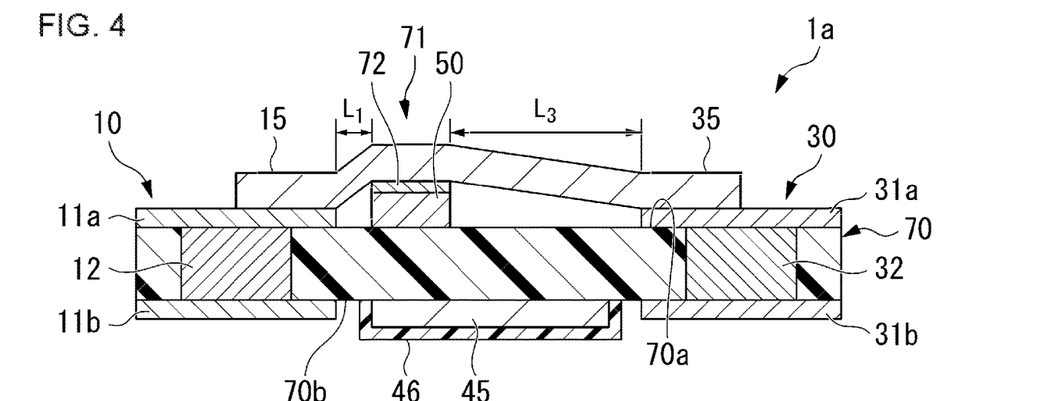
FIG. 4 A IV-IV line cross-sectional view of the protection element illustrated in FIG. 2.
Figure 5:
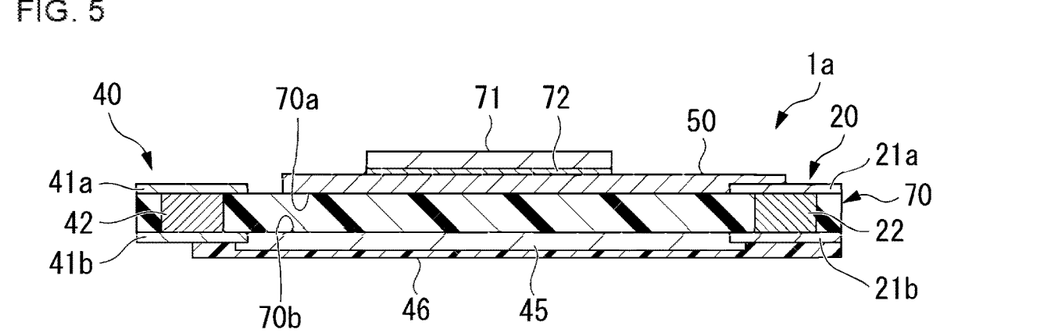
FIG. 5 A V-V line cross-sectional view of the protection element illustrated in FIG. 2.

FIG. 2 is a plan view illustrating one example of the protection element of the first embodiment of the present invention. FIG. 3 is a bottom surface view of the protection element illustrated in FIG. 2. FIG. 4 is a IV-IV line cross-sectional view of the protection element illustrated in FIG. 2. FIG. 5 is a V-V line cross-sectional view of the protection element illustrated in FIG. 2.

A protection element 1a illustrated in FIGS. 2 to 5 has a substrate 70, and the first terminal 10, second terminal 20, third terminal 30, fourth terminal 40, and intermediate electrode 50 provided on the substrate 70. The substrate 70 is a quadrangle having four sides seen in a plan view wherein the first terminal 10 and the third terminal 30 oppose each other, the second terminal 20 and the fourth terminal 40 oppose each other, and these are respectively provided on each side of the substrate 70.

The first terminal 10 is configured from a first front-surface electrode 11a provided on a substrate front-surface 70a, a first rear-surface electrode 11b provided on a substrate rear-surface 70b, and a first through-hole 12 connecting the first front-surface electrode 11a and the first rear-surface electrode 11b. Similarly, the second terminal 20 is configured from a second front-surface electrode 21a, a second rear-surface electrode 21b, and a second through-hole 22. The third terminal 30 is configured from a third front-surface electrode 31a, a third rear-surface electrode 31b, and a third through-hole 32. The fourth terminal 40 is configured from a fourth front-surface electrode 41a, a fourth rear-surface electrode 41b, and a fourth through-hole 42. Note that for the fourth terminal, it is possible to have the fourth rear-surface electrode 41b alone and omit the fourth front-surface electrode 41a and the fourth through-hole 42.

The intermediate electrode 50 is provided on the substrate front-surface 70a of the substrate 70. The intermediate electrode 50 is connected directly to the second front-surface electrode 21a of the second terminal 20. The intermediate electrode 50 extends to pass between the first terminal 10 and the third terminal 30. The intermediate electrode 50 is disposed at a position where a distance $L_3$ between the third terminal 30 and the intermediate electrode 50 is longer than a distance $L_1$ between the first terminal and the intermediate electrode 50.

The first fuse element 15 connecting the first terminal 10 and the intermediate electrode 50 and the third fuse element 35 connecting the third terminal 30 and the intermediate electrode 50 are linked to constitute one belt-shaped fuse linked body 71. The fuse linked body 71 connects the intermediate electrode 50, and the first terminal 10 and the third terminal 30 via a conductive connection material 72.

The fourth rear-surface electrode 41b of the fourth terminal 40 is connected to one end portion of the heater 45. Another end portion of the heater 45 is connected to the second rear-surface electrode 21b of the second terminal 20. The heater 45 is covered by an insulation layer 46.

A material of the substrate 70 is not particularly limited so long as it has insulating properties. For example, substrates used in printed circuit boards such as ceramic substrates or glass epoxy substrates, as well as glass substrates, resin substrates, insulation-treated metal substrates, and the like may be used. Note that among these, a ceramic substrate, an insulating substrate with excellent heat resistance and good heat conductivity, is preferable.

For example, silver, copper, tungsten, or an alloy containing these metals may be used as a material of the first terminal 10, the second terminal 20, the third terminal the fourth terminal 40, and the intermediate electrode 50. Various low-melting-point metals conventionally used as a fuse material may be used as a material of the fuse linked body 71. SnSb alloys, BiSnPb alloys, BiPbSn alloys, BiPb alloys, BiSn alloys, SnPb alloys, SnAg alloys, PbIn alloys, ZnAl alloys, InSn alloys, PbAgSn alloys, and the like may be given as examples of a low-melting-point metal. For example, a solder material may be used as a conductive connection material 72.

For example, a high-resistance conductive material may be used as a material of the heater 45. Nichrome, W, Mo, Ru, and the like or a material containing these metals may be used as the high-resistance conductive material. For example, glass may be used as a material of the insulation layer 46.

In the protection element 1a, when an overcurrent is passed during discharge, the current path is interrupted by the third fuse element 35 of the fuse linked body 71 generating heat and fusing. Moreover, when an overcurrent is passed during charge, the current path is interrupted by the first fuse element 15 of the fuse linked body 71 generating heat and fusing. Furthermore, during an abnormality other than the generation of an overcurrent, current is provided to the fourth terminal and the heater 45 generates heat. The first fuse element 15 and the third fuse element 35 are fused by the heat of the heater 45 transmitting to the second rear-surface electrode 21b of the second terminal 20 and being transmitted to the intermediate electrode 50 via the second through-hole 22 the second front-surface electrode 21a.

In the protection element 1a, the distance $L_3$ between the third terminal 30 of the fuse linked body 71 and the intermediate electrode 50 is longer than the distance $L_1$ between the first terminal 10 and the intermediate electrode 50, and therefore the electrical resistance of the third fuse element 35 is higher than the electrical resistance of the first fuse element 15. Thus, the protection element 1a secures safety during discharge and is capable of rapid charging during charge.

Figure 6:
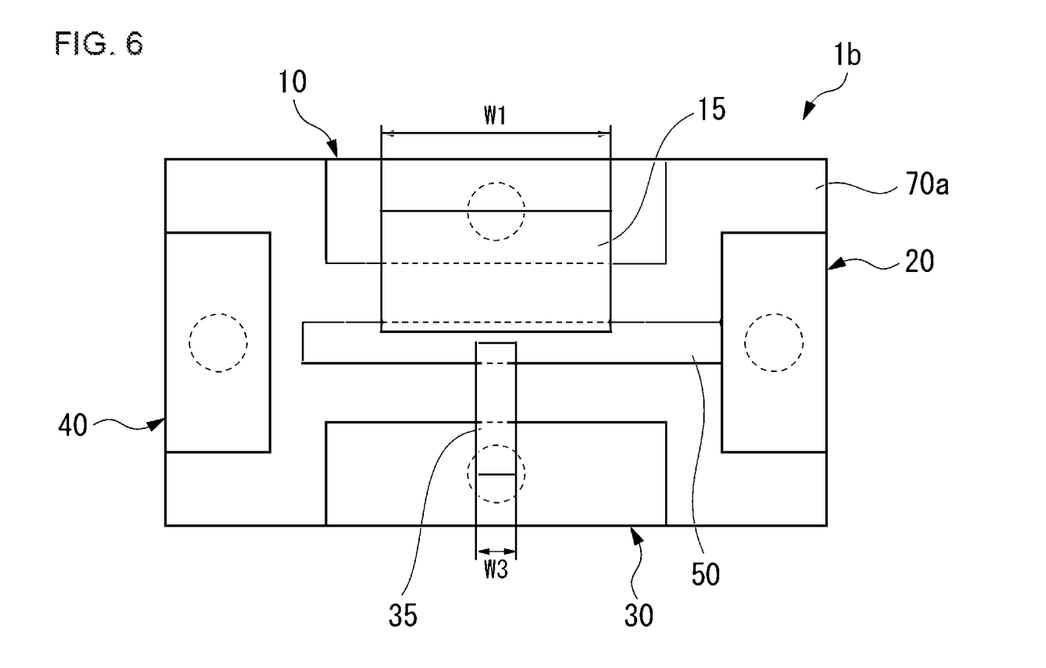
FIG. 6 A plan view illustrating another example of the protection element of the first embodiment of the present invention.

FIG. 6 is a plan view illustrating another example of the protection element of the first embodiment of the present invention.

A protection element 1b illustrated in FIG. 6 differs from the protection element 1a above in the following points and has other points in common. Thus, parts common to the protection element 1b and the protection element 1a are given the same reference signs and a description thereof is omitted.

(1) The first fuse element 15 connecting the first terminal 10 and the intermediate electrode 50 and the third fuse element 35 connecting the third terminal 30 and the intermediate electrode 50 are separated.

(2) The intermediate electrode 50 is disposed at a position between the first terminal 10 and the third terminal 30.

(3) A width $W_3$ of the third fuse element 35 is narrower than a width $W_1$ of the first fuse element 15.

In the protection element 1b, the electrical resistance of the third fuse element 35 is higher than the electrical resistance of the first fuse element 15 due to the width $W_3$ of the third fuse element 35 being narrower than the width $W_1$ of the first fuse element 15. Thus, the protection element 1b, like the protection element 1a, secures safety during discharge and is capable of rapid charging during charge.

Figure 7:
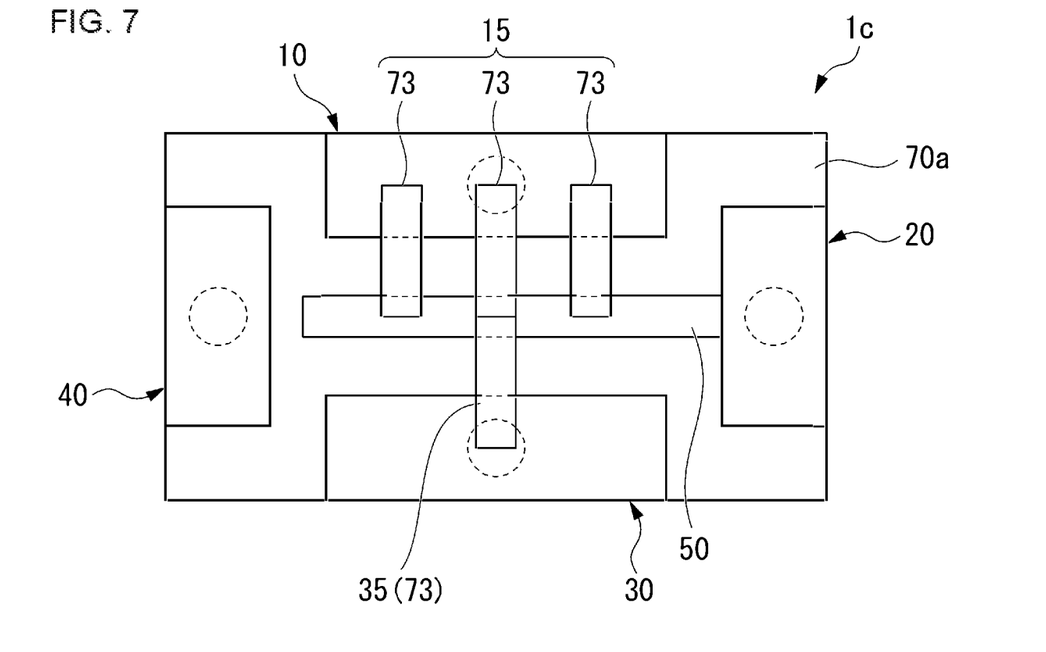
FIG. 7 A plan view illustrating a further example of the protection element of the first embodiment of the present invention.

FIG. 7 is a plan view illustrating a further example of the protection element of the first embodiment of the present invention.

A protection element 1c illustrated in FIG. 7 differs from the protection element 1a above in the following points and has other points in common. Thus, parts common to the protection element 1c and the protection element 1a are given the same reference signs and a description thereof is omitted.

(1) The first fuse element 15 connecting the first terminal 10 and the intermediate electrode 50 and the third fuse element 35 connecting the third terminal 30 and the intermediate electrode 50 are separated.
(2) The intermediate electrode 50 is disposed at a position between the first terminal 10 and the third terminal 30.
(3) The first fuse element 15 and the third fuse element 35 are each formed from a fuse element piece 73, wherein the first fuse element 15 is configured by a plurality (in FIG. 7, three) of the fuse element piece 73, whereas the third fuse element 35 is configured by one fuse element piece 73.

In the protection element 1c, the electrical resistance of the third fuse element is higher than the electrical resistance of the first fuse element 15 due to number of fuse element pieces 73 constituting the third fuse element 35 being fewer than the number of fuse element pieces 73 constituted the first fuse element 15. Thus, the protection element 1c, like the protection element 1a, secures safety during discharge and is capable of rapid charging during charge. Note that in FIG. 7, the number of fuse element pieces 73 constituting the first fuse element 15 is three, but there is no particular limit to the number of fuse element pieces 73. The number of fuse element pieces 73 may be a plurality of two or more, for example, in a range of two to twenty.

Figure 8:
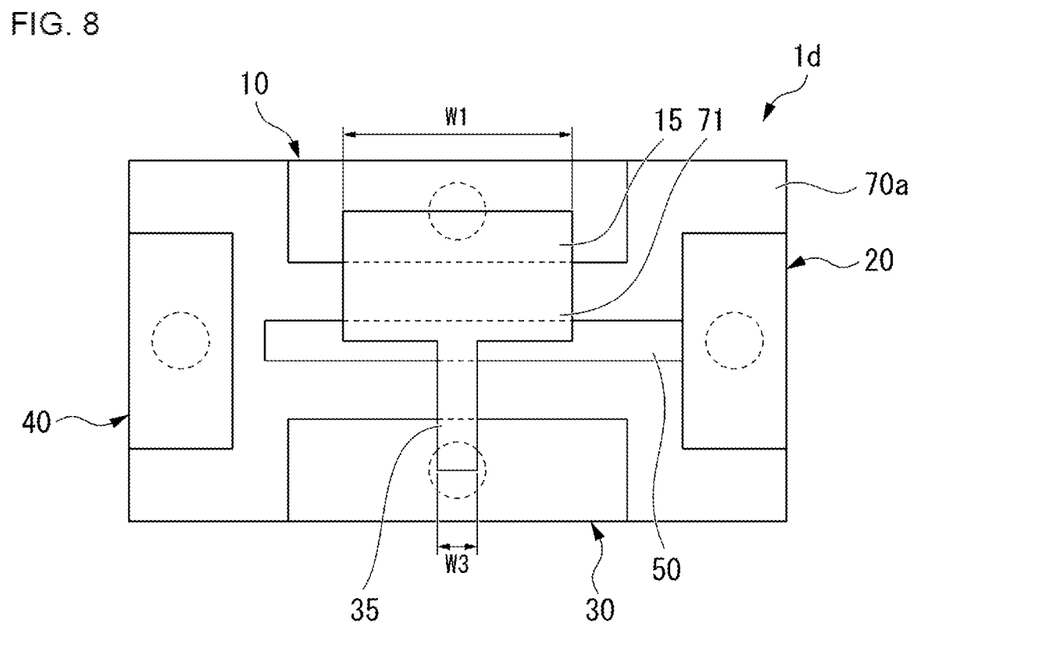
FIG. 8 A plan view illustrating a further example of the protection element of the first embodiment of the present invention.

FIG. 8 is a plan view illustrating a further example of the protection element of the first embodiment of the present invention.

A protection element 1d illustrated in FIG. 8 differs from the protection element 1a above in the following points and has other points in common. Thus, parts common to the protection element 1d and the protection element 1a are given the same reference signs and a description thereof is omitted.

(1) The intermediate electrode 50 is disposed at a position between the first terminal 10 and the third terminal 30.
(2) Within the fuse linked body 71, the width $W_3$ of the third fuse element 35 connecting the third terminal 30 and the intermediate electrode 50 is narrower than the width $W_1$ of the first fuse element 15 connecting the first terminal 10 and the intermediate electrode 50.

In the protection element 1d, the electrical resistance of the third fuse element is higher than the electrical resistance of the first fuse element 15 due to the width $W_3$ of the third fuse element 35 being narrower than the width $W_1$ of the first fuse element 15. Thus, the protection element 1d, like the protection element 1a, secures safety during discharge and is capable of rapid charging during charge.

Figure 9:
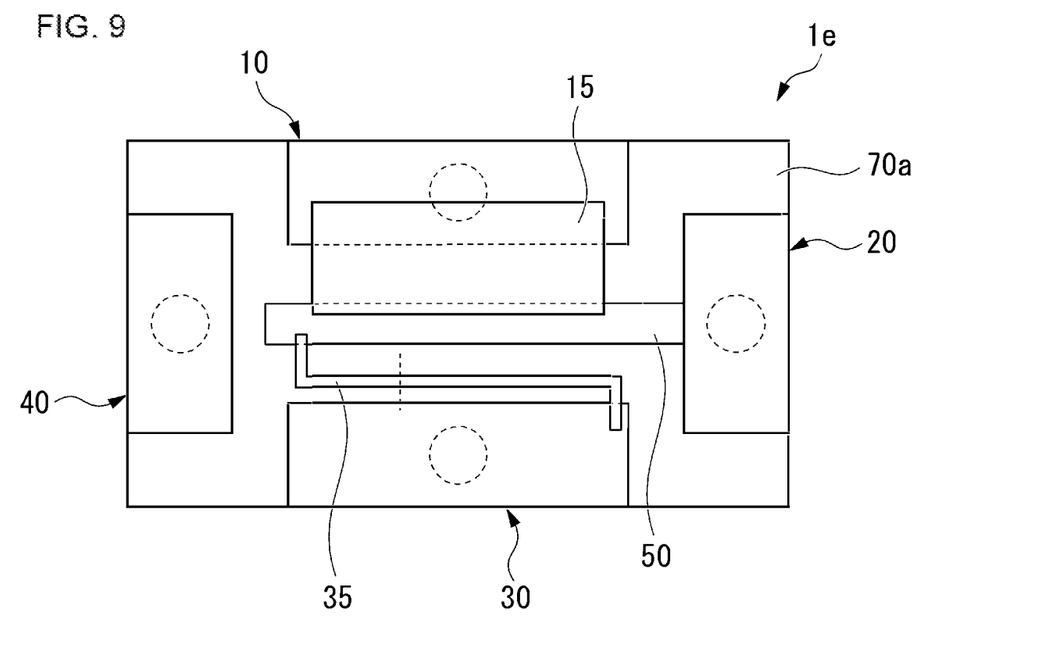
FIG. 9 A plan view illustrating a further example of the protection element of the first embodiment of the present invention.

FIG. 9 is a plan view illustrating a further example of the protection element of the first embodiment of the present invention.

A protection element 1e illustrated in FIG. 9 differs from the protection element 1a above in the following points and has other points in common. Thus, parts common to the protection element 1e and the protection element 1a are given the same reference signs and a description thereof is omitted.

(1) The first fuse element 15 and the third fuse element 35 are separated.
(2) The intermediate electrode 50 is disposed at a position between the first terminal 10 and the third terminal 30.
(3) The third fuse element 35 is made into a narrow line-shaped pattern fuse element formed by a printing method.

In the protection element 1e, the electrical resistance of the third fuse element 35 is higher than the electrical resistance of the first fuse element 15 due to the third fuse element 35 being made into a narrow line-shaped pattern fuse element formed by a printing method. Thus, the protection element 1e, like the protection element 1a, secures safety during discharge and is capable of rapid charging during charge.

Figure 10:
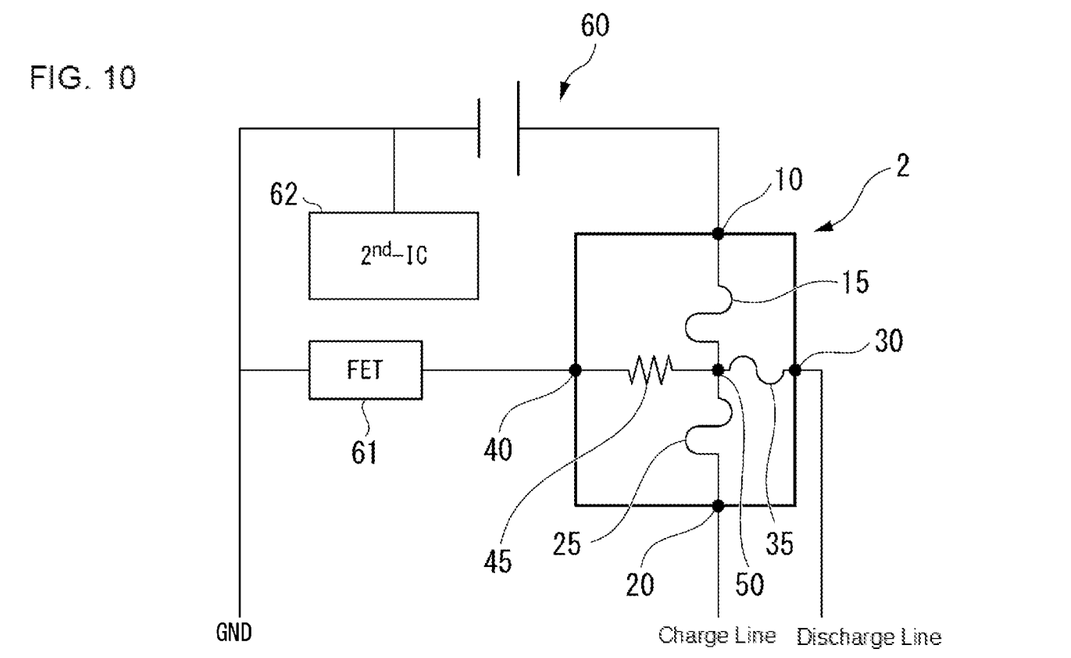
FIG. 10 A circuit diagram of a power source unit of an electronic device provided with a protection element of a second embodiment of the present invention.

FIG. 10 is a circuit diagram of a power source unit of an electronic device provided with a protection element of a second embodiment of the present invention.

A protection element 2 illustrated in FIG. 10 differs from the protection element 1 of the first embodiment in that, a first terminal 10 and a second terminal 20 are disposed so as to oppose each other and a third terminal 30 and a fourth terminal 40 are disposed so as to oppose each other, and the second terminal 20 and an intermediate electrode 50 are connected via a second fuse element 25, and has the other points in common. Thus, parts common to the protection element 2 and the protection element 1 are given the same reference signs and a description thereof is omitted.

In the protection element 2, the fuse elements connecting the first terminal 10 and the second terminal 20 are a first fuse element 15 and the second fuse element 25. The rated current value when the first fuse element 15 and the second fuse element 25 are connected in series is preferably 10 A or more and is more preferably in a range of A or more and 30 A or less. Moreover, the electrical resistance value when the first fuse element 15 and the second fuse element 25 are connected in series is preferably 1.0 mΩ or less and is more preferably in a range of 0.15 mΩ or more and 0.6 mΩ or less.

In the protection element 2, the electrical resistance of a third fuse element 35 is set to be higher than the electrical resistance of the second fuse element 25. Therefore, safety during discharge can be secured because the rated current value during discharge can be made relatively lower than the rated current value during charge. Meanwhile, a power source 60 can be charged at a current value relatively higher during charge than during discharge and rapid charging is possible because the rated current value during charge can be made relatively higher than the rated current value during discharge.

Figure 11:
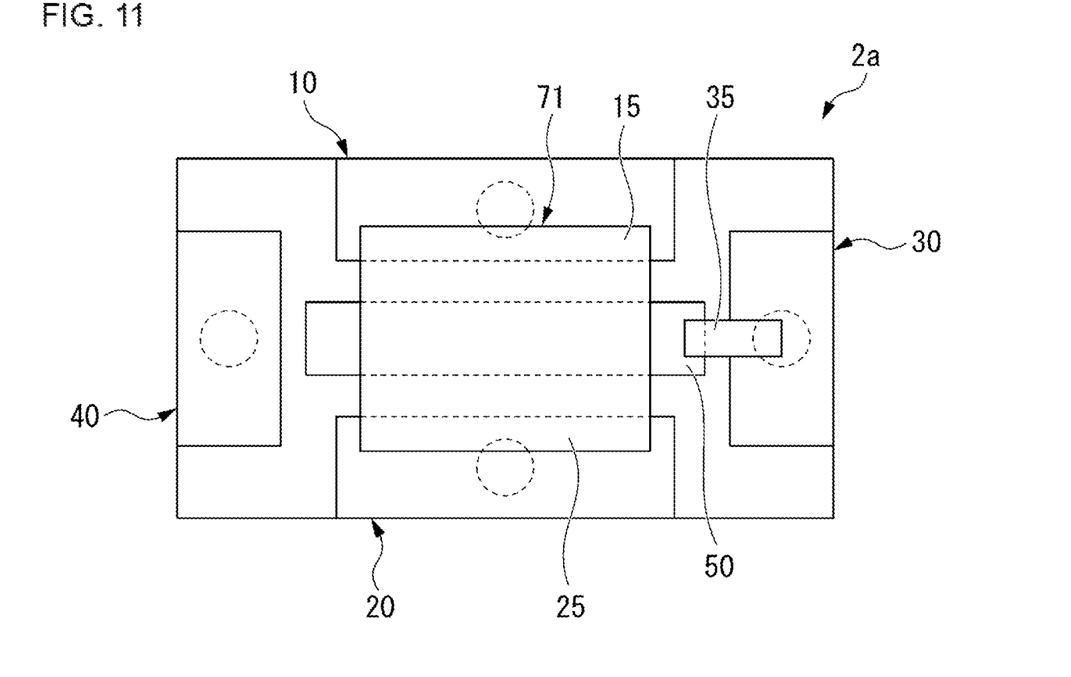
FIG. 11 A plan view illustrating one example of the protection element of the second embodiment of the present invention.

FIG. 11 is a plan view illustrating one example of the protection element of the second embodiment of the present invention.

In a protection element 2a illustrated in FIG. 11, the first fuse element 15 and the second fuse element 25 are made into a belt-shaped fuse linked body 71 having a large width, and the belt-shaped third fuse element 35 has a narrower width compared to the fuse linked body 71.

In the protection element 2*a*, the first fuse element 15 connecting the first terminal 10 and the intermediate electrode 50 is common, but the electrical resistance of the third fuse element 35 is higher than the electrical resistance of the second fuse element 25 due to the width of the third fuse element 35 being narrower than the width of the second fuse element 25. Thus, the protection element 2*a*, like the protection element 1*a*, secures safety during discharge and is capable of rapid charging during charge.

Figure 12:
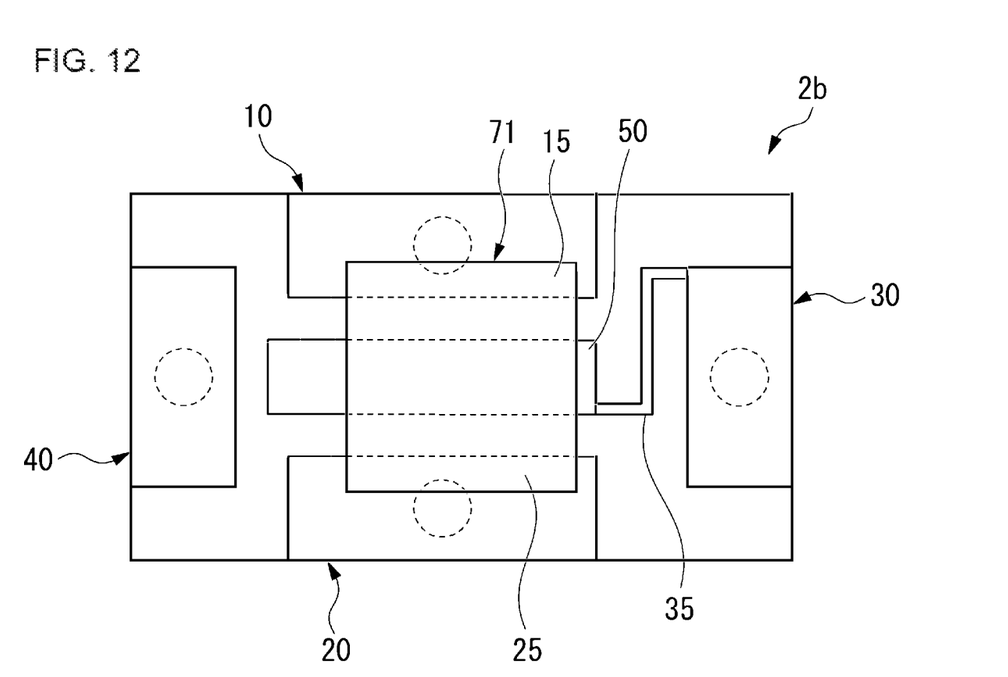
FIG. 12 A plan view illustrating another example of the protection element of the second embodiment of the present invention.

FIG. 12 is a plan view illustrating another example of the protection element of the second embodiment of the present invention.

A protection element 2*b* illustrated in FIG. 12 is common in that the third fuse element 35 is made into a narrow line-shaped pattern fuse element formed by a printing method.

In the protection element 2*b*, the electrical resistance of the third fuse element is higher than the electrical resistance of the second fuse element 25 due to the third fuse element 35 being made into a narrow line-shaped pattern fuse element formed by a printing method. Thus, the protection element 2*b*, like the protection element 2*a*, secures safety during discharge and is capable of rapid charging during charge.

The above describes embodiments of the present invention, but the present invention is not limited by the above embodiments, and various modifications or changes may be made within a scope of the essentials of the present invention stated in the scope of patent claims.

For example, the protection element 2 according to the second embodiment may be configured with the first terminal 10 and the intermediate electrode 50 being directly connected, having the second fuse element 25 connecting the second terminal and the intermediate electrode 50, and the third fuse element 35 connecting the third terminal 30 and the intermediate electrode 50, wherein the third fuse element 35 has a higher electrical resistance than the second fuse element 25. In a protection element having this configuration, it is preferable to control the switch 61 using the control device 62 so that it is possible to stop passing a current through the heater 45 when the heater 45 generates heat and the second fuse element 25 and the third fuse element 35 are fused.

DESCRIPTION OF REFERENCE SIGNS

1, 1*a*, 1*b*, 1*c*, 1*d*, 1*e*, 2, 2*a*, 2*b* Protection element
10 First terminal
11*a* First front-surface electrode
11*b* First rear-surface electrode
12 First through-hole
15 First fuse element
20 Second terminal
21*a* Second front-surface electrode
21*b* Second rear-surface electrode
22 Second through-hole
25 Second fuse element
30 Third terminal
31*a* Third front-surface electrode
31*b* Third rear-surface electrode
32 Third through-hole
35 Third fuse element
40 Fourth terminal
41*a* Fourth front-surface electrode
41*b* Fourth rear-surface electrode
42 Fourth through-hole
45 Heater
46 Insulation layer
50 Intermediate electrode
60 Power source
61 Switch
62 Control device
70 Substrate
70*a* Substrate front-surface
70*b* Substrate rear-surface
71 Fuse linked body
72 Conductive connection material
73 Fuse element piece

The invention claimed is:

1. A protection element comprising:
a first terminal; and
a second terminal and third terminal respectively connected to the first terminal via lines having at least one fusible part,
wherein
at least a portion of the at least one fusible part between the first terminal and the third terminal has a higher electrical resistance than the at least one fusible part between the first terminal and the second terminal,
the first terminal is connected to a power source capable of charge and discharge,
the second terminal is connected to a charge line, and
the third terminal is connected to a discharge line.

2. The protection element according to claim 1, further comprising an intermediate electrode,
wherein
the at least one fusible part comprises a first fuse element, a second fuse element, and a third fuse element,
the first fuse element connects the first terminal and the intermediate electrode,
the second fuse element connects the second terminal and the intermediate electrode, and
the third fuse element connects the third terminal and the intermediate electrode, and
the third fuse element has a higher electrical resistance than the second fuse element.

3. An electronic device comprising:
a power source and
the protection element according to claim 2 connected to the power source.

4. The electronic device according to claim 3, further comprising
a controller configured to detect a voltage of the power source, and
a switch configured to operate when determined that an overcharge is generated in the power source based on the detected voltage.

5. The electronic device according to claim 3, wherein the power source is a lithium-ion secondary battery or a capacitor.

6. The protection element according to claim 1, further comprising an intermediate electrode,
wherein
the at least one fusible part comprises a first fuse element and a second fuse element,
the second terminal and the intermediate electrode directly connected,
the first fuse element connects the first terminal and the intermediate electrode,
the second fuse element connects the third terminal and the intermediate electrode, and
the second fuse element has a higher electrical resistance than the first fuse element.

7. An electronic device comprising:
a power source and
the protection element according to claim 6 connected to the power source.

8. The electronic device according to claim 7, further comprising
a controller configured to detect a voltage of the power source, and
a switch configured to operate when determined that an overcharge is generated in the power source based on the detected voltage.

9. The electronic device according to claim 7, wherein the power source is a lithium-ion secondary battery or a capacitor.

10. The protection element according to claim 6, further comprising a fourth terminal and a heater, wherein the fourth terminal is connected to the intermediate electrode via the heater.

11. An electronic device comprising:
a power source and
the protection element according to claim 9 connected to the power source.

12. The electronic device according to claim 11, further comprising
a controller configured to detect a voltage of the power source, and
a switch configured to operate when determined that an overcharge is generated in the power source based on the detected voltage.

13. The electronic device according to claim 11, wherein the power source is a lithium-ion secondary battery or a capacitor.

14. The protection element according to claim 2, further comprising a fourth terminal and a heater, wherein the fourth terminal is connected to the intermediate electrode via the heater.

15. An electronic device comprising:
a power source and
the protection element according to claim 14 connected to the power source.

16. The electronic device according to claim 15, further comprising
a controller configured to detect a voltage of the power source, and
a switch configured to operate when determined that an overcharge is generated in the power source based on the detected voltage.

17. The electronic device according to claim 15, wherein the power source is a lithium-ion secondary battery or a capacitor.

18. An electronic device comprising:
a power source and
the protection element according to claim 1 connected to the power source.

19. The electronic device according to claim 6, further comprising
a controller configured to detect a voltage of the power source, and
a switch configured to operate when determined that an overcharge is generated in the power source based on the detected voltage.

20. The electronic device according to claim 18, wherein the power source is a lithium-ion secondary battery or a capacitor.

* * * * *